US012112675B2

(12) United States Patent
Chang et al.

(10) Patent No.: US 12,112,675 B2
(45) Date of Patent: Oct. 8, 2024

(54) DISPLAY PANEL GRAYSCALE COMPENSATION METHOD, GRAYSCALE COMPENSATION DEVICE, AND GRAYSCALE COMPENSATION SYSTEM

(71) Applicant: TCL CHINA STAR OPTOELECTRONICS TECHNOLOGY CO., LTD., Shenzhen (CN)

(72) Inventors: Yuhua Chang, Shenzhen (CN); Wenli Wang, Shenzhen (CN)

( * ) Notice: Subject to any disclaimer, the term of this patent is extended or adjusted under 35 U.S.C. 154(b) by 0 days.

(21) Appl. No.: 17/287,541

(22) PCT Filed: Apr. 16, 2021

(86) PCT No.: PCT/CN2021/087853
§ 371 (c)(1),
(2) Date: Oct. 6, 2022

(87) PCT Pub. No.: WO2022/205521
PCT Pub. Date: Oct. 6, 2022

(65) Prior Publication Data

US 2024/0013696 A1 Jan. 11, 2024

(30) Foreign Application Priority Data

Mar. 31, 2021 (CN) ........................ 202110351674.6

(51) Int. Cl.
*G09G 3/20* (2006.01)

(52) U.S. Cl.
CPC ... *G09G 3/2007* (2013.01); *G09G 2320/0233* (2013.01); *G09G 2320/0626* (2013.01); *G09G 2320/0673* (2013.01); *G09G 2360/16* (2013.01)

(58) Field of Classification Search
CPC ......... G09G 3/2007; G09G 2320/0233; G09G 2320/0626; G09G 2320/0673;
(Continued)

(56) References Cited

U.S. PATENT DOCUMENTS

| | | | |
|---|---|---|---|
| 2015/0145894 | A1 | 5/2015 | Kim et al. |
| 2016/0247432 | A1 | 8/2016 | Hu et al. |

(Continued)

FOREIGN PATENT DOCUMENTS

| | | | |
|---|---|---|---|
| CN | 102831870 | A | 12/2012 |
| CN | 103531175 | A | 1/2014 |

(Continued)

OTHER PUBLICATIONS

International Search Report in International application No. PCT/CN2021/087853, mailed on Dec. 13, 2021.

(Continued)

*Primary Examiner* — Rodney Amadiz

(57) ABSTRACT

The present invention discloses a display panel grayscale compensation method, a grayscale compensation device, and a grayscale compensation system. The grayscale compensation method, by acquiring at least one set of image data corresponding to bonding point grayscale values of the display panel, and by dividing the display panel into a main display region and sub-display regions through the image data, can determine grayscale compensation values corresponding to pixels in the sub-display region according to the average gamma value of each sub-display region, which can increase precision of a single grayscale compensation of the pixels in the display panel.

5 Claims, 6 Drawing Sheets

(58) Field of Classification Search
CPC ....... G09G 2360/16; G09G 2320/0276; G09G 2320/0686; G09G 2320/0693; G09G 2360/145; G09G 2320/0271
See application file for complete search history.

(56) References Cited

U.S. PATENT DOCUMENTS

| | | | | |
|---|---|---|---|---|
| 2020/0193937 | A1* | 6/2020 | Tsai | G09G 5/02 |
| 2022/0198977 | A1* | 6/2022 | Kim | G09G 3/20 |

FOREIGN PATENT DOCUMENTS

| | | | |
|---|---|---|---|
| CN | 104505043 | A | 4/2015 |
| CN | 105575326 | A | 5/2016 |
| CN | 106601167 | A | 4/2017 |
| CN | 107045863 | A | 8/2017 |
| CN | 107657916 | A | 2/2018 |
| CN | 110364111 | A | 10/2019 |
| CN | 111210756 | A | 5/2020 |
| CN | 111968583 | A | 11/2020 |
| CN | 112216236 | A | 1/2021 |
| CN | 112530347 | A | 3/2021 |
| JP | 2000298450 | A | 10/2000 |
| JP | 2002162930 | A | 6/2002 |
| JP | 2007114427 | A | 5/2007 |
| JP | 2013044959 | A | 3/2013 |
| JP | 2018529128 | A | 10/2018 |

OTHER PUBLICATIONS

Written Opinion of the International Search Authority in International application No. PCT/CN2021/087853,mailed on Dec. 13, 2021.
Chinese Office Action issued in corresponding Chinese Patent Application No. 202110351674.6 dated Aug. 4, 2022, pp. 1-11.
Chinese Office Action issued in corresponding Chinese Patent Application No. 202110351674.6 dated Jan. 28, 2023, pp. 1-11.
Japanese Office Action issued in corresponding Japanese Patent Application No. 特願 2021-521830 dated Jun. 19, 2023, pp. 1-7.

* cited by examiner

DISPLAY PANEL GRAYSCALE COMPENSATION METHOD, GRAYSCALE COMPENSATION DEVICE, AND GRAYSCALE COMPENSATION SYSTEM

FIELD OF INVENTION

The present invention relates to a field of display technologies, specifically to a display panel grayscale compensation method, a grayscale compensation device, and a grayscale compensation system.

BACKGROUND OF INVENTION

A display panel, when implementing brightness demura repair, usually employs a brightness value and a gamma value of a center of a panel as a target value to guarantee optical characteristics of a center of the product. With reference to FIG. 1, a central point employs a gamma curve of gamma 23, and a gamma value corresponding to a grayscale value of a certain bonding point is 2.218 for grayscale compensation calculation of the display panel. A grayscale compensation at other locations is matched according to grayscale difference between the center and the locations. However, because actual gamma values of points on the panel are different, as shown in FIG. 1, employed gamma curves are gamma11-gamma35. At a same bonding point grayscale value, different gamma curves correspond to different gamma values. Therefore, when grayscale difference compensation is implemented according to the brightness value and the gamma value of the center point, precision of a single grayscale compensation is low.

SUMMARY OF INVENTION

Technical Issue

The present invention provides a display panel grayscale compensation method, a grayscale compensation device, and a grayscale compensation system to ease a technical issue of a undesirably low precision of a single grayscale compensation implemented by a display panel.

Technical Solution

In a first aspect, the present invention provides a display panel grayscale compensation method, comprising: acquiring at least one set of image data corresponding to bonding point grayscale values of pixels of the display panel;

dividing the display panel as a main display region and at least one sub-display region according to the image data and acquiring an average gamma value of each sub-display region; and determining a grayscale compensation value corresponding to the bonding point grayscale value of each pixel in the sub-display region based on the average gamma value of each sub-display region.

In some embodiments, the step of acquiring at least one set of image data corresponding to bonding point grayscale values of pixels of the display panel, comprises: determining a plurality of bonding point grayscale values of the display panel; acquiring a set of image data, wherein the image data comprises pixel data of each pixel based on each of the bonding point grayscale values; and determining a pixel brightness value and a pixel coordinate of the pixel data.

In some embodiments, the step of dividing the display panel as a main display region and at least one sub-display region according to the image data and acquiring the average gamma value of each sub-display region, comprises: determining a first brightness difference threshold value among the pixels of in the image data; and dividing the display panel as the main display region and the at least one sub-display region based on the first brightness difference threshold value and the pixel coordinate.

In some embodiments, the step of dividing the display panel as a main display region and at least one sub-display region according to the image data and acquiring the average gamma value of each sub-display region, further comprises: fitting a brightness-grayscale relationship curve based on pairs of the bonding point grayscale values and the pixel brightness values of the same pixel; determining a gamma value of each pixel according to the brightness-grayscale relationship curve; and calculating the average gamma value of the sub-display region based on the gamma value and the pixel coordinate of each pixel.

In some embodiments, the step of determining a grayscale compensation value corresponding to the bonding point grayscale value of each pixel in the sub-display region based on the average gamma value of each sub-display region, comprises: acquiring the average gamma value in the sub-display region according to the gamma value of each pixel in the sub-display region; determining a first actual grayscale value corresponding to the pixel brightness value of each pixel based on the brightness-grayscale relationship curve and the average gamma value; determining a target grayscale value based on the brightness-grayscale relationship curve, wherein the target grayscale value is a second actual grayscale value corresponding to the bonding point grayscale value of each pixel in the main display region; and determining the grayscale compensation value according to a difference result between the second actual grayscale value and the first actual grayscale value.

In some embodiments, the step of determining a first actual grayscale value corresponding to the pixel brightness value of each pixel based on the brightness-grayscale relationship curve and the average gamma value, comprises: determining the sub-display region in which the pixel is located according to the pixel coordinate of the pixel; determining the average gamma value of the sub-display region as the average gamma value of the pixel; and acquiring the first actual grayscale value of each pixel based on the brightness-grayscale relationship curve and the average gamma value of the pixel.

In some embodiments, after the step of determining a grayscale compensation value corresponding to the bonding point grayscale value of each pixel in the sub-display region based on the average gamma value of each sub-display region, the method further comprises: acquiring a grayscale compensation table corresponding to the bonding point grayscale value based on the grayscale compensation value corresponding to the bonding point grayscale value of each pixel in the at least one sub-display region; and burning the grayscale compensation table into the display panel.

In some embodiments, after the step of burning the grayscale compensation table into the display panel, the method further comprises: acquiring image data corresponding to the grayscale compensation table; evaluating a grayscale compensation effect of the display panel; if the grayscale compensation effect conforms to an expected compensation effect, terminating the grayscale compensation method, wherein the expected compensation effect is that a difference between the pixel brightness value of one of the pixels in the sub-display region and the pixel brightness value of another of the pixels in the main display region is less than or equal to a second brightness difference threshold value; if the grayscale compensation effect fails to conform to the expected compensation effect, repeating the grayscale compensation method as described in at least one of the above embodiments.

In a second aspect, the present invention provides a grayscale compensation device, comprising: an acquisition module configured to acquire at least one set of image data corresponding to bonding point grayscale values of pixels of the display panel; a processing module configured to divide the display panel as a main display region and at least one sub-display region according to the image data and acquire an average gamma value of each sub-display region; and a determination module configured to determine a grayscale compensation value corresponding to the bonding point grayscale value of each pixel in the sub-display region based on the average gamma value of each sub-display region.

In a third aspect, the present invention provides a grayscale compensation system, a display panel; the grayscale compensation device as described in any one of the embodiments, configured to determine a grayscale compensation value of the display panel; a burning device connected to the display panel and the grayscale compensation device, and configured to burn the grayscale compensation value into the display panel.

Advantages

The display panel grayscale compensation method, the grayscale compensation device, and the grayscale compensation system of the present invention provides, by dividing the display panel into a main display region and sub-display regions through image data, can determine grayscale compensation values corresponding to pixels in the sub-display region according to the average gamma value of each sub-display region, which can increase precision of a single grayscale compensation of the pixels in the display panel.

DETAILED DESCRIPTION OF EMBODIMENTS

To make the objective, the technical solution, and the effect of the present invention clearer and more explicit, the present invention will be further described in detail below with reference to the accompanying drawings. It should be understood that the specific embodiments described here are only used to explain the present invention instead of being used to limit the present invention.

Figure 1:
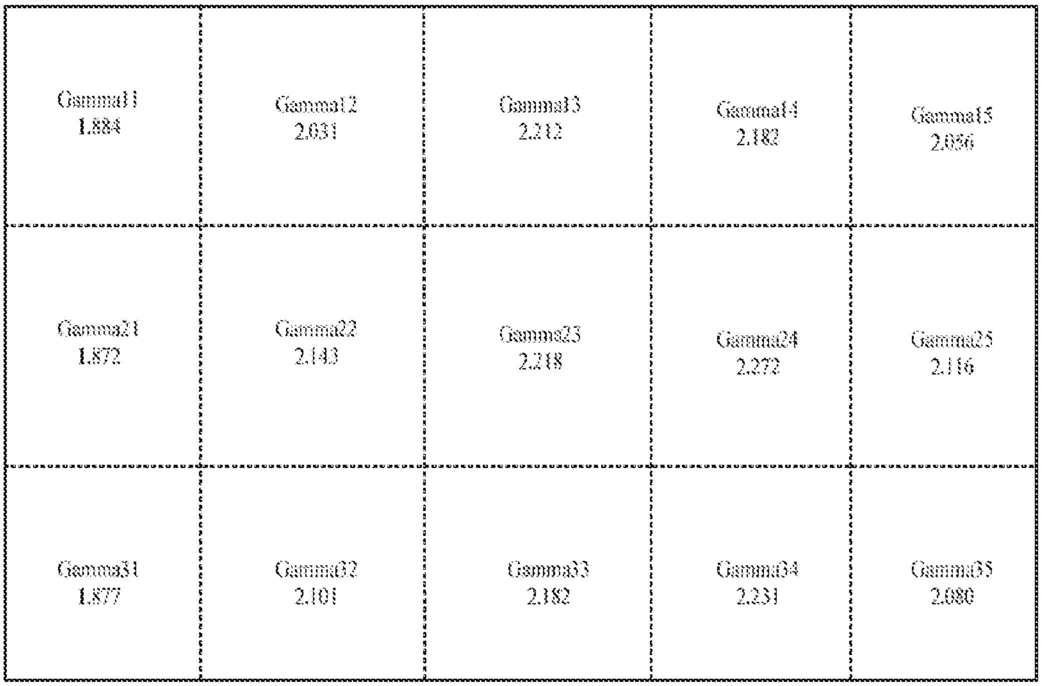
FIG. 1 Prior Art
FIG. 1 is a structural schematic view of distribution of divisions and gamma values of a conventional display panel.
Figure 2:
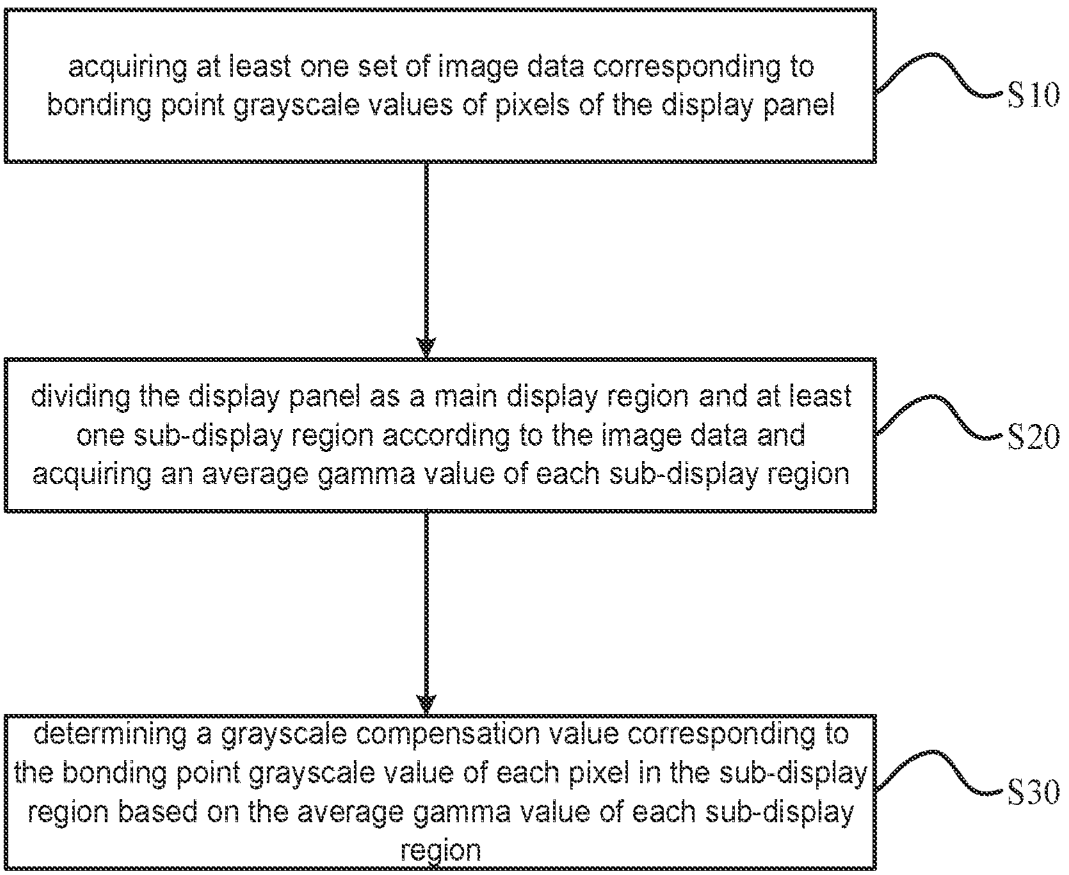
FIG. 2 is a flowchart of a grayscale compensation method provided by an embodiment of the present application.

With reference to FIGS. 1 to 6, as shown in FIG. 2, the present embodiment provides a display panel grayscale compensation method comprising steps as follows.

A step S10 comprises acquiring at least one set of image data corresponding to bonding point grayscale values of pixels of the display panel.

A step S20 comprises dividing the display panel as a main display region and at least one sub-display region according to the image data and acquiring an average gamma value of each sub-display region.

A step S30 comprises determining a grayscale compensation value corresponding to the bonding point grayscale value of each pixel in the sub-display region based on the average gamma value of each sub-display region.

It can be understood that the display panel grayscale compensation method provided by the present embodiment, by dividing the display panel into a main display region and sub-display regions through image data, can determine a grayscale compensation value of a corresponding pixel in the sub-display region based on the average gamma value of each sub-display region, which can increase precision of a single grayscale compensation of the pixels in the display panel.

It should be explained that the display panel in the present embodiment comprises one or a plurality of bonding point grayscale values, a set of image data can be acquired according each of the bonding point grayscale values. The set of image data is an original image data included by a frame of an image driven on the display panel driving by a corresponding one of the bonding point grayscale values. The original image data can be acquired by an image acquisition module, for example a camera, and the original image data can comprise a pixel coordinate and a pixel brightness value of each pixel.

The pixel brightness values correspond to grayscale values of the pixels one by one. Therefore, corresponding grayscale values of the pixels can be acquired based on different pixel brightness values.

The bonding point grayscale values can be but are not limited to at least one of grayscale L0, grayscale L25, grayscale L48, grayscale L64, grayscale L128, grayscale L225, or grayscale L255. As such, a brightness-grayscale relationship curve can be fitted and calculated according to different bonding point grayscale values of the same pixel and corresponding pixel brightness values.

Accordingly, a gamma value corresponding to the pixel with the bonding point grayscale values can be acquired through bonding point grayscale values and some pixel brightness values corresponding to bonding point grayscale values according to a corresponding formula.

Therefore, divisions of the pixels in the image data can be implemented according to a range of difference between pixel brightness values of the pixels. In general, pixel brightness values in a central region are greater. As such, the pixels in the central region are divided in a main display region, and the pixels in other regions are divided in at least one sub-display region. It can be understood that a pixel coordinate of each pixel in the image data can correspond to a pixel coordinate of each pixel in the display panel through coordinate conversion.

Based on distribution of the gamma values and the sub-display regions of the pixels, pixels and gamma values of the pixels included by the sub-display region can be determined. After the gamma values of the pixels in the same sub-display region, plus each other, are divided by a number of the pixels in the sub-display region, an average gamma value of the sub-display region is acquired.

When a grayscale compensation value corresponding to the bonding point grayscale value of each pixel of each sub-display region, the average gamma value of the sub-display region in which the pixel is located, instead of the gamma value of one pixel in the main display region, is employed, which can eliminate or reduce the technical issue of poor precision of the grayscale compensation value acquired based on the gamma value of one pixel in the main display region.

In one embodiment, the step of acquiring at least one set of image data corresponding to bonding point grayscale values of pixels of the display panel, comprises: determining a plurality of bonding point grayscale values of the display panel; acquiring a set of image data, wherein the image data comprises pixel data of each pixel based on each of the bonding point grayscale values; and determining a pixel brightness value and a pixel coordinate of the pixel data.

It should be explained that the image data in the present embodiment can be an original image data generated by shooting screen images of the display panel. Then, the image acquisition module such as a camera generated an image corresponding to the original image data. The original image data can comprise a pixel brightness value and a pixel coordinate of each pixel.

In one embodiment, the step of dividing the display panel as a main display region and at least one sub-display region according to the image data and acquiring the average gamma value of each sub-display region, comprises: determining a first brightness difference threshold value among the pixels of in the image data; and dividing the display panel as the main display region and the at least one sub-display region based on the first brightness difference threshold value and the pixel coordinate.

It can be understood that the pixel brightness value of each pixel can be acquired according to the image data. Pixels in a brightness range and pixel coordinates corresponding the pixels can be acquired according to a pixel brightness value of each pixel. Then, regions in which the pixels in the same brightness range are located serve as a sub-display region. In the same way, locations of other sub-display regions can be acquired.

In one embodiment, the step of dividing the display panel as a main display region and at least one sub-display region according to the image data and acquiring the average gamma value of each sub-display region, further comprises: fitting a brightness-grayscale relationship curve based on pairs of the bonding point grayscale values and the pixel brightness values of the same pixel; determining a gamma value of each pixel according to the brightness-grayscale relationship curve; and calculating the average gamma value of the sub-display region based on the gamma value and the pixel coordinate of each pixel.

In one embodiment, the step of determining a grayscale compensation value corresponding to the bonding point grayscale value of each pixel in the sub-display region based on the average gamma value of each sub-display region, comprises: acquiring the average gamma value in the sub-display region according to the gamma value of each pixel in the sub-display region; determining a first actual grayscale value corresponding to the pixel brightness value of each pixel based on the brightness-grayscale relationship curve and the average gamma value; determining a target grayscale value based on the brightness-grayscale relationship curve, wherein the target grayscale value is a second actual grayscale value corresponding to the bonding point grayscale value of each pixel in the main display region; and determining the grayscale compensation value according to a difference result between the second actual grayscale value and the first actual grayscale value.

It should be explained that in the image data, a grayscale value of one pixel in the main display region can be selected as a target grayscale value according to the pixel coordinate.

In one embodiment, the step of determining a first actual grayscale value corresponding to the pixel brightness value of each pixel based on the brightness-grayscale relationship curve and the average gamma value comprises: determining the sub-display region in which the pixel is located according to the pixel coordinate of the pixel; determining the average gamma value of the sub-display region as the average gamma value of the pixel; and acquiring the first actual grayscale value of each pixel based on the brightness-grayscale relationship curve and the average gamma value of the pixel.

It should be explained that based on the pixel coordinate in each sub-display region acquired, pixels corresponding to the sub-display region can be determined through the pixel coordinate.

In one embodiment, after the step of determining a grayscale compensation value corresponding to the bonding point grayscale value of each pixel in the sub-display region based on the average gamma value of each sub-display region, the method further comprises: acquiring a grayscale compensation table corresponding to the bonding point grayscale value based on the grayscale compensation value corresponding to the bonding point grayscale value of each pixel in the at least one sub-display region; and burning the grayscale compensation table into the display panel.

In one embodiment, after the step of burning the grayscale compensation table into the display panel, the method further comprises: acquiring image data corresponding to the grayscale compensation table; evaluating a grayscale compensation effect of the display panel; if the grayscale compensation effect conforms to an expected compensation effect, terminating the grayscale compensation method, wherein the expected compensation effect is that a difference between the pixel brightness value of one of the pixels in the sub-display region and the pixel brightness value of another of the pixels in the main display region is less than or equal to a second brightness difference threshold value; if the grayscale compensation effect fails to conform to the expected compensation effect, repeating the grayscale compensation method as described in at least one of the above embodiments.

Figure 3:
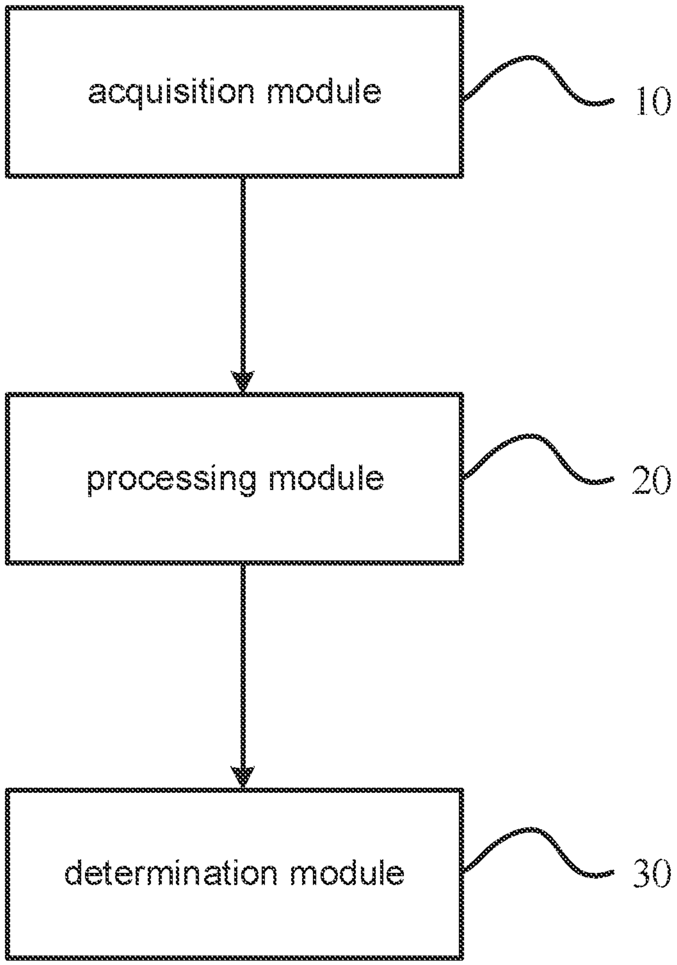
FIG. 3 is a schematic structural view of a grayscale compensation device provided by an embodiment of the present application.

With reference to FIG. 3, in one embodiment, the present embodiment provides a grayscale compensation device comprising an acquisition module 10, a processing module 20, and a determination module 30. The acquisition module 10 is configured to acquire at least one set of image data corresponding to bonding point grayscale values of pixels of the display panel. The processing module 20 is configured to divide the display panel as a main display region and at least one sub-display region according to the image data and acquire an average gamma value of each sub-display region. The determination module 30 is configured to determine a grayscale compensation value corresponding to the bonding point grayscale value of each pixel in the sub-display region based on the average gamma value of each sub-display region.

It can be understood that the grayscale compensation device provided by the present embodiment, by dividing the display panel into a main display region and sub-display regions through image data, can determine a grayscale compensation value of a corresponding pixel in the sub-display region based on the average gamma value of each sub-display region, which can increase precision of a single grayscale compensation of the pixels in the display panel.

Figure 4:
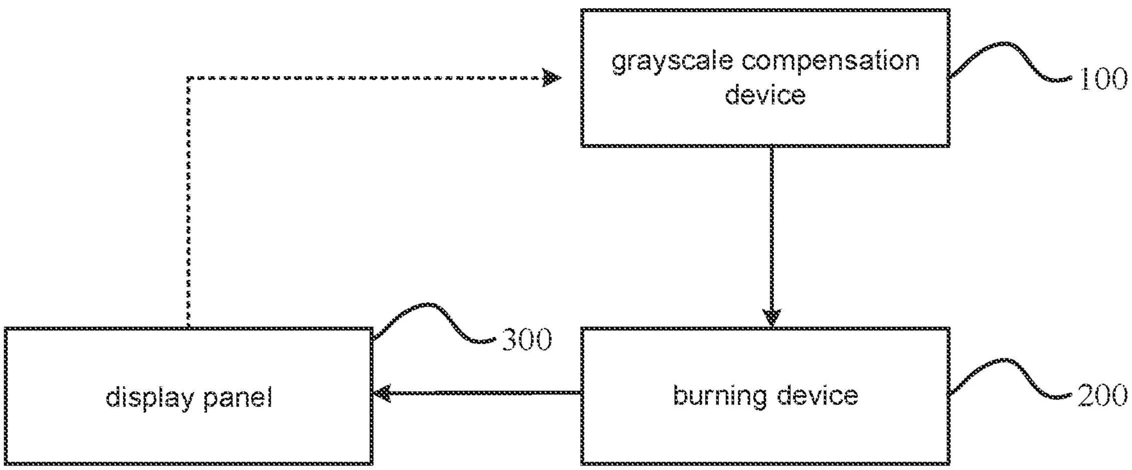
FIG. 4 is a schematic structural view of a grayscale compensation system provided by an embodiment of the present application.
Figure 5:
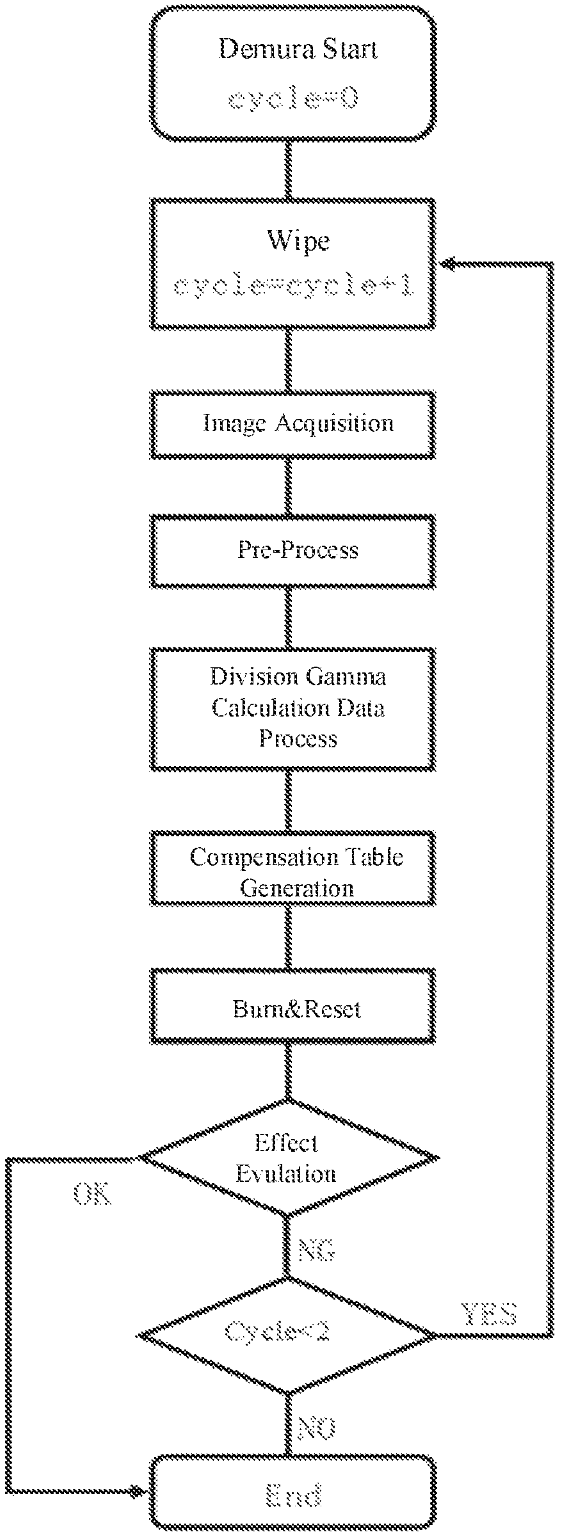
FIG. 5 is a flowchart of grayscale compensation provided by an embodiment of the present application.

With reference to FIG. 4, in one embodiment, the present embodiment provides a grayscale compensation system comprising a display panel 300, the grayscale compensation device 100 as described in any one of the above embodiments, and a burning device 200. The grayscale compensation device 100 is configured to determine a grayscale compensation value of the display panel. The burning device 200 is connected to the display panel 300 and the grayscale compensation device, and is configured to burn the grayscale compensation value into the display panel 300.

It can be understood that the grayscale compensation system provided by the present embodiment, by dividing the display panel into a main display region and sub-display regions through image data, can determine a grayscale compensation value of a corresponding pixel in the sub-display region based on the average gamma value of each sub-display region, which can increase precision of a single grayscale compensation of the pixels in the display panel.

As described above, with reference to FIG. 5, the grayscale compensation process of the above embodiments in detail is as follows:

At the time of a start of demura, grayscale compensation write cycle is reset to zero. Then, original grayscale compensation data in a flash ram of X printed circuit board of the display panel is wiped, a timing controller of the display panel is reset, and a grayscale compensation write cycle is set as 1.

Shooting and acquiring an image by a camera: according to the process of a camera shooting a picture including an initial mura brightness value corresponding to different predetermined bonding point grayscale values in the display panel, a corresponding image data can be acquired. The image data includes a coordinate of each pixel and a brightness value of each pixel.

Pre-process and division gamma calculation data process: image divisions are determined according to difference of the brightness values of the pixels. For example, brightness differences in a certain range define a division. Because the bonding point grayscale values and the brightness value of each pixel are known, according to a formula 1 and a formula 2 as follows, gamma values of the each pixel at different bonding point grayscale values. Then, an average gamma value of each division is calculated according to the gamma value of each pixel. Specifically, image division to bonding point grayscale values (L25, L48, L64, L128, L225, etc.) to be compensated is implemented according to an actual gamma difference condition of each region of the display panel. For example, with reference to FIG. 1, the panel can be divided into regions of 3×5, a brightness-grayscale relationship curve is fitted according to the acquired bonding point grayscale values and corresponding brightness values, and an average gamma value of each division of each region is calculated according to according to the formula 2.

$$\frac{Lum(X)}{Lum(255)-Lum(0)}=\left(\frac{X}{255}\right)^{gamma} \quad \text{Formula (1)}$$

Formula 2 as follows is acquired according to transformation of formula 1:

$$\text{gamma}=\log_{\left(\frac{X}{255}\right)}\times\left(\frac{Lum(X)}{Lum(255)-Lum(0)}\right) \quad \text{Formula (2)}$$

Formula 3 as follows is acquired according to transformation of formula 2:

$$X=255\times\sqrt{\left(\frac{Lum(X)}{Lum(255)-Lum(0)}\right)} \quad \text{Formula (3)}$$

X is a corresponding grayscale value, which can be a bonding point grayscale value or a grayscale value to be calculated; Lum (X) is a brightness value of a grayscale X acquired by the camera; Lum (255) and Lum (0) are brightness values corresponding to grayscale L255 and grayscale L0 acquired by the camera; and gamma can be a gamma value or an average gamma value.

Figure 6:
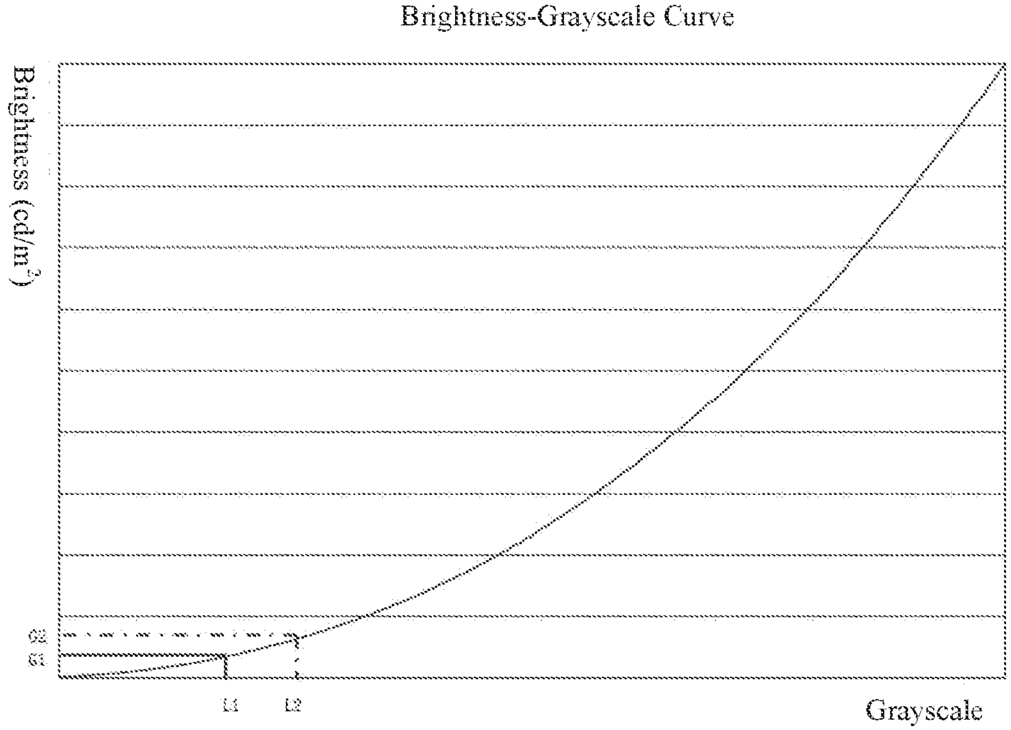
FIG. 6 is a schematic structural view of a brightness-grayscale relationship curve provided by an embodiment of the present application.

Generation of grayscale compensation table: a difference between a pixel brightness value of each pixel and the target brightness value is calculated according to a value acquisition range of a target grayscale value based on a central region of the display panel, a divisions (m, n) in which a pixel coordinate (i, j) of one pixel is located is determined. Such divisions can be arranged in an array, m can be a number of rows distributed along a first direction, and n can be a number of columns distributed along a second direction. A gamma value of a corresponding pixel is selected as an average gamma value (m, n) value of a corresponding region, then a brightness-grayscale transformation is implemented according to the formula (3) to acquire a grayscale value corresponding to the average gamma value. For example, with reference to FIG. 6, one pixel in a division, according to the brightness-grayscale relationship curve fitted and generated as shown in FIG. 6, a brightness value of a grayscale L1 is G1, and the target brightness value of the central point is G2. According to a brightness-grayscale relationship curve, an average gamma value of the division, a grayscale L2 corresponding to brightness G2 can be acquired through the formula (3), and a grayscale compensation value required by the bonding point grayscale value of the pixel is ΔL=(L2−L1). As such, grayscale compensation values corresponding to the bonding point grayscale values of different pixels can be acquired. Then, according to grayscale compensation values of different pixels at the same bonding point grayscale value, a corresponding grayscale compensation table can be generated. In the same way, grayscale compensation tables corresponding to other bonding point grayscale values can be acquired.

The grayscale compensation tables are burned into the timing controller of the display panel, and the timing controller (Reset TCON) is reset.

Evaluation of a grayscale compensation effect of the display panel: when a grayscale compensation effect conforms to an expected compensation effect, the above grayscale compensation process is terminated; when a grayscale compensation effect fails to conform to expected compensation effect, it is determined whether the grayscale compensation write cycle is less than 2, if grayscale compensation write cycle is less than 2, the above compensation process is repeated; if the grayscale compensation write cycle is equal to or greater than 2, the above grayscale compensation process is terminated.

It can be understood that the above grayscale compensation process can achieve compensation by brightness-grayscale transformation based on gamma values of different divisions to provide a one-time repair compensation effect when difference between regions of the panel are great, which prevents an additional cost due to multi-repair.

During the demura process, the photographed picture, after pre-process, is divided into divisions of m*n (m, n values can be changed according to an actual difference condition of the panel), and average gamma value of each division is fitted and calculated. When compensation data of each pixel of the panel is calculated, a compensation value is calculated by brightness-grayscale transformation using a gamma value of a corresponding region. The issue that a single demura repair cannot has a best compensation effect when a difference of gamma values of regions and central point is greater can be solved.

Based on the above grayscale compensation process, in a same way, the number of grayscale compensations can be reduced, the time cost for the grayscale compensations can be reduced, and the production cost of the display panel can be reduced.

It can be understood that for a person of ordinary skill in the art, equivalent replacements or changes can be made according to the technical solution of the present invention and its inventive concept, and all these changes or replacements should belong to the scope of protection of the appended claims of the present invention.

What is claimed is:

1. A display panel grayscale compensation method, comprising:

acquiring at least one set of image data corresponding to bonding point grayscale values of pixels of the display panel;

dividing the display panel into a main display region and at least one sub-display region according to the image data and acquiring an average gamma value of each of the least one sub-display region; and determining a grayscale compensation value corresponding to the bonding point grayscale value of any one of the pixels in the at least one sub-display region based on the average gamma value of each of the least one sub-display region;

wherein the step of acquiring at least one set of image data corresponding to bonding point grayscale values of pixels of the display panel comprises:

determining a plurality of bonding point grayscale values of the display panel;

acquiring a set of image data, wherein the image data comprises pixel data of each pixel based on each of the bonding point grayscale values; and determining a pixel brightness value and a pixel coordinate of the pixel data;

wherein the step of dividing the display panel into a main display region and at least one sub-display region according to the image data and acquiring the average gamma value of each of the least one sub-display region comprises:

determining a first brightness difference threshold value among pixels in the image data; and dividing the display panel as the main display region and the at least one sub-display region based on the first brightness difference threshold value and the pixel coordinate;

wherein the step of dividing the display panel into a main display region and at least one sub-display region according to the image data and acquiring the average gamma value of each of the least one sub-display region further comprises:

fitting a brightness-grayscale relationship curve based on pairs of the bonding point grayscale values and pixel brightness values of a same pixel;

determining a gamma value of each pixel according to the brightness-grayscale relationship curve; and calculating the average gamma value of the at least one sub-display region based on the gamma value and the pixel coordinate of each pixel.

2. The grayscale compensation method as claimed in claim 1, wherein the step of determining a grayscale compensation value corresponding to the bonding point grayscale value of each pixel in the at least one sub-display region based on the average gamma value of each of the least one sub-display region comprises:

acquiring the average gamma value in the at least one sub-display region according to the gamma value of each pixel in the at least one sub-display region;

determining a first actual grayscale value corresponding to the pixel brightness value of each pixel based on the brightness-grayscale relationship curve and the average gamma value;

determining a target grayscale value based on the brightness-grayscale relationship curve, wherein the target grayscale value is a second actual grayscale value corresponding to the bonding point grayscale value of each pixel in the main display region; and determining the grayscale compensation value according to a difference result between the second actual grayscale value and the first actual grayscale value.

3. The grayscale compensation method as claimed in claim 2, wherein the step of determining a first actual grayscale value corresponding to the pixel brightness value of each pixel based on the brightness-grayscale relationship curve and the average gamma value comprises:

determining the at least one sub-display region in which the pixel is located according to the pixel coordinate of the pixel;

determining the average gamma value of the at least one sub-display region as the average gamma value of the pixel; and acquiring the first actual grayscale value of each pixel based on the brightness-grayscale relationship curve and the average gamma value of the pixel.

4. The grayscale compensation method as claimed in claim 1, wherein after the step of determining a grayscale compensation value corresponding to the bonding point grayscale value of any one of the pixels in the at least one sub-display region based on the average gamma value of each of the least one sub-display region, the method further comprises:

acquiring a grayscale compensation table corresponding to the bonding point grayscale value based on the grayscale compensation value corresponding to the bonding point grayscale value of any one of the pixels in the at least one sub-display region; and burning the grayscale compensation table into the display panel.

5. The grayscale compensation method as claimed in claim 4, wherein after the step of burning the grayscale compensation table into the display panel, the method further comprises:

acquiring image data corresponding to the grayscale compensation table;

evaluating a grayscale compensation effect of the display panel; wherein if the grayscale compensation effect conforms to an expected compensation effect, terminating the grayscale compensation method, wherein the expected compensation effect is that a difference between the pixel brightness value of one of the pixels in the at least one sub-display region and the pixel brightness value of another of the pixels in the main display region is less than or equal to a second brightness difference threshold value;

if the grayscale compensation effect fails to conform to the expected compensation effect, repeating the grayscale compensation method as claimed in claim 1.

* * * * *